(12) United States Patent
Williamson

(10) Patent No.: US 6,425,724 B1
(45) Date of Patent: *Jul. 30, 2002

(54) HAND TRUCK WITH PUSHER PLATE

(76) Inventor: Gary L. Williamson, 14644 83rd La. North, Loxahatchee, FL (US) 33470

( * ) Notice: Subject to any disclaimer, the term of this patent is extended or adjusted under 35 U.S.C. 154(b) by 0 days.

This patent is subject to a terminal disclaimer.

(21) Appl. No.: 09/634,280

(22) Filed: Aug. 9, 2000

Related U.S. Application Data

(63) Continuation-in-part of application No. 09/404,676, filed on Sep. 23, 1999, now Pat. No. 6,227,789.

(51) Int. Cl.⁷ .................................................. B62B 1/10
(52) U.S. Cl. ...................... 414/490; 414/493; 280/47.29
(58) Field of Search ................................ 414/490, 444, 414/491, 492, 493, 446; 280/47.131, 47.17, 47.24, 47.27, 47.28, 47.29

(56) References Cited

U.S. PATENT DOCUMENTS

| | | | |
|---|---|---|---|
| 993,265 A | 5/1911 | McCoy | |
| 2,240,355 A | 4/1941 | Swimley | |
| 2,682,348 A | 6/1954 | Stumphauzer | |
| 2,834,494 A | 5/1958 | Peters | |
| 2,953,267 A | * 9/1960 | Gorman | 414/490 |
| 3,403,800 A | 10/1968 | Botello | |
| 3,647,238 A | 3/1972 | Mackey | |
| 3,878,958 A | 4/1975 | Ring | |
| 5,256,025 A | 10/1993 | Williamson | |
| 5,290,051 A | 3/1994 | Olson | |
| 5,599,156 A | 2/1997 | Layne et al. | |
| 5,624,224 A | 4/1997 | Brandenburg | |
| 5,971,693 A | 10/1999 | Story et al. | |
| 6,227,789 B1 | * 5/2001 | Williamson | 414/490 |

FOREIGN PATENT DOCUMENTS

| | | | |
|---|---|---|---|
| AT | 194322 | * 3/1957 | 414/490 |
| DE | 1225055 | * 9/1966 | 414/490 |

* cited by examiner

*Primary Examiner*—Frank E. Werner
(74) *Attorney, Agent, or Firm*—Akerman Senterfitt

(57) ABSTRACT

A hand truck includes a frame having an upper portion and a lower portion, and a cargo support pivotally attached to the lower portion of the frame. A pair of wheels rotatably mounted to the frame, and an unload mechanism having a latched position and an unlatched position is pivotally coupled to the cargo support and the frame. In the unlatched position, pulling the upper portion of the frame rearward causes the unload mechanism to urge the load off of the cargo support.

4 Claims, 8 Drawing Sheets

HAND TRUCK WITH PUSHER PLATE

CROSS REFERENCES TO RELATED APPLICATIONS

This application is a Continuation-In-Part of U.S. patent application Ser. No. 09/404,676 filed on Sep. 23, 1999 U.S. Pat. No. 6,227,789.

STATEMENT REGARDING FEDERALLY SPONSORED RESEARCH

Not Applicable

BACKGROUND OF THE INVENTION

The present invention relates to hand trucks for transporting loads, such as goods contained in a box; and more particularly to such transporting devices that include a mechanism for pushing the load off of the hand truck.

Hand trucks have been adapted in various ways to facilitate the carrying of loads. A typical hand truck design includes a frame with an axle at a lower end with a pair of wheels mounted on the axle. The lower end of the frame also has a bed or platform attached thereto onto which the load is positioned during transport. The upper end has either handles or at least an area designed for grasping by the user.

To use the hand truck of this type, the user positions it adjacent to the load with the platform against the floor on which the load is located. The hand truck then is pushed toward the load so that the platform slides under the load. In most cases, the load has to be tilted by hand so that the platform is able to slide thereunder. A second person may be required to tilt the load while the first person moves the hand truck.

Once the load is on the platform, the hand truck is tilted about the axle by pulling the upper end away from the load while the wheels are maintained relatively stationary. This action causes the platform to lift the load off the floor and back against the tilted frame of the hand truck. The hand truck and its load then are pulled or pushed along the floor.

To unload the hand truck, the frame is lowered so that the platform again rests on the floor. Then the hand truck is pulled away from the load so that the platform slides out from under the load. A second person may also be necessary to tilt the load while the first person moves the hand truck. In other cases, the user has to carry the load off of the platform.

One particularly useful method for unloading a hand truck is to pivot the platform, and allow the load to slip off, such as described in U.S. Pat. No. 5,256,025. This particular improvement over the prior has proven successful in many applications. However, in certain situations, such as when the load is heavy and does not slide easily, additional efforts to unload the load are required.

Unload mechanisms, such as disclosed in U.S. Pat. Nos. 2,682,348; 5,290,051; and 5,624,224, push a load off of a fixed platform. These mechanisms require the user to release the hand truck handle to operate the unload mechanism or to step on a lever which can result in a loss of control of the hand truck if the load unexpectedly moves off of the platform. Furthermore, if the above unload mechanisms are used with a platform, the mechanism may engage a load above the load center of gravity causing it to tip.

SUMMARY OF THE INVENTION

The present invention provides a hand truck for transporting a load. The hand truck includes a frame having an upper portion and a lower portion, and a cargo support pivotally attached to the lower portion of the frame. A pair of wheels are rotatably connected to the frame, and an unload mechanism having a latched position and an unlatched position is pivotally coupled to the cargo support and the frame. In the unlatched position, pulling the upper portion of the frame rearward causes the unload mechanism to urge the load off of the cargo support.

In one aspect of the invention, the unload mechanism includes a linkage mechanism pivotally coupled to the frame which urges a pusher plate against the load to urge the load off of the platform.

In another aspect of the present invention the unload mechanism includes a linkage mechanism having a push arm pivotally coupled to a pusher plate and a push end of a rocker arm. The rocker arm is pivotally mounted to the cargo support, and has a pull end pivotally coupled to one end of a pull arm. The opposing end of the pull arm is pivotally coupled to the hand truck frame, wherein pulling on the hand truck frame pulls on the pull arm which pivots the rocker arm to push the push arm to urge the pusher plate against the load.

A general objective of the present invention is to provide a hand truck unload mechanism to assist a user to remove a load from the hand truck. This objective is a accomplished by providing a pusher plate linked to the hand truck frame that urges the load off of the platform.

Another object of the present invention is to provide a hand truck mechanism which is operable while maintaining control of the hand truck during the unload operation. This objective is accomplished by providing an unload mechanism which is operated by pulling back on the hand truck handle.

These and still other objects and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF THE INVENTION

Figure 1:
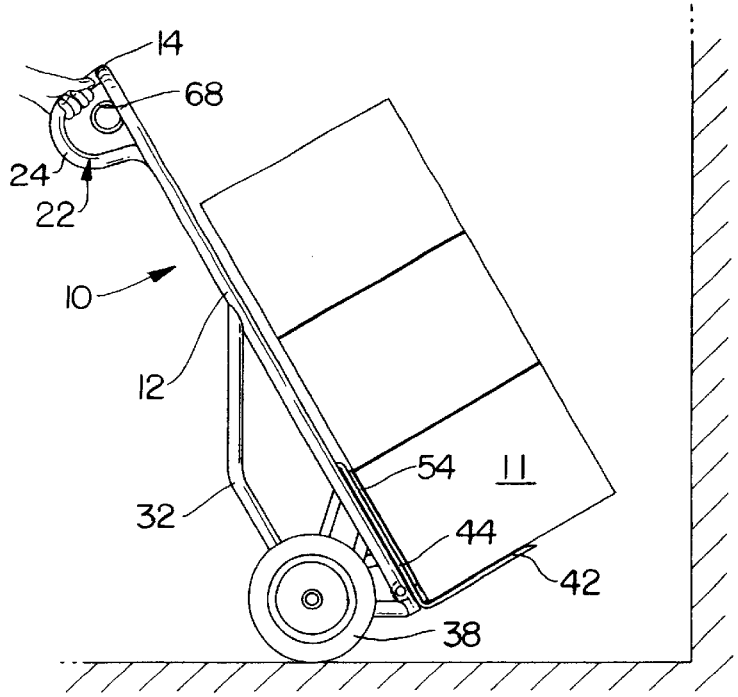
FIG. 1 is a side view of a hand truck in a latched position according to the present invention.
Figure 2:
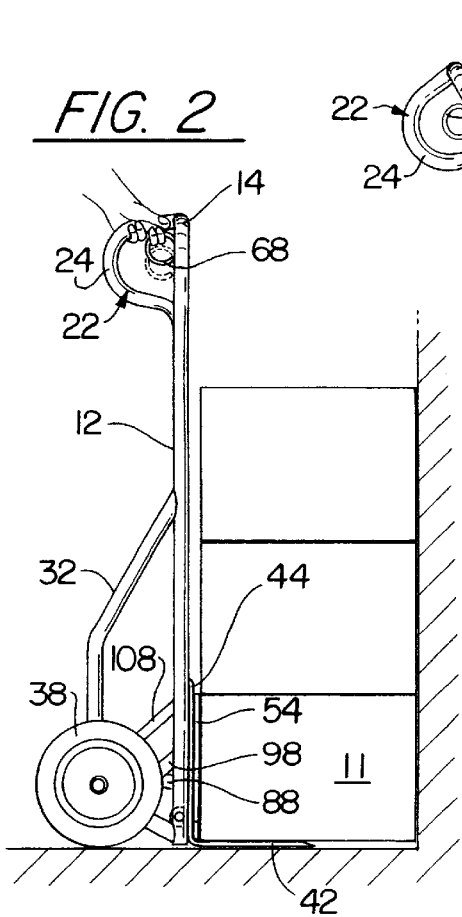
FIG. 2 is a side view of the hand truck of FIG. 1 which is about to unload a load.
Figure 6:
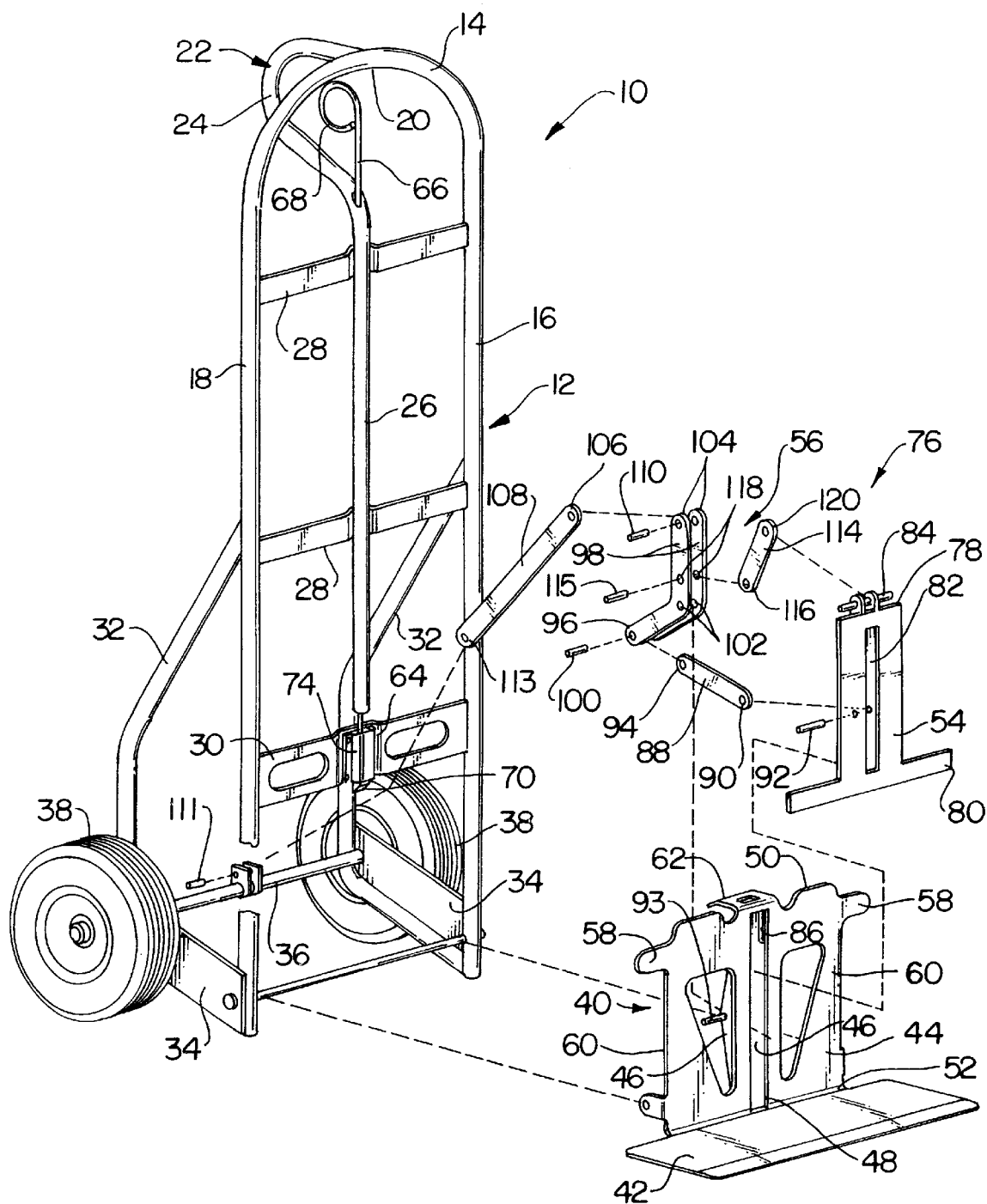
FIG. 6 is an exploded perspective view of the hand truck of FIG. 1.
Figure 7:
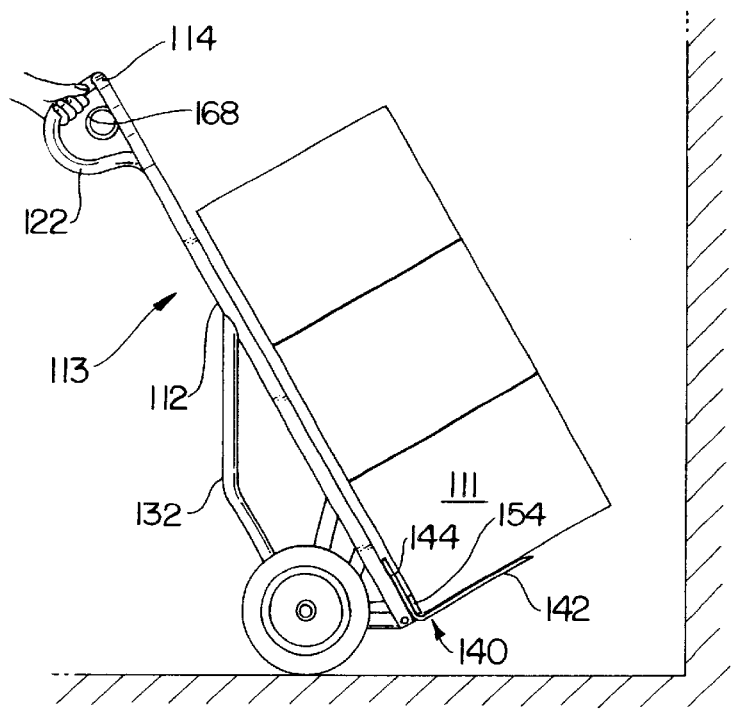
FIG. 7 is a side view of a second embodiment of a hand truck in a latched position according to the present invention.
Figure 8:
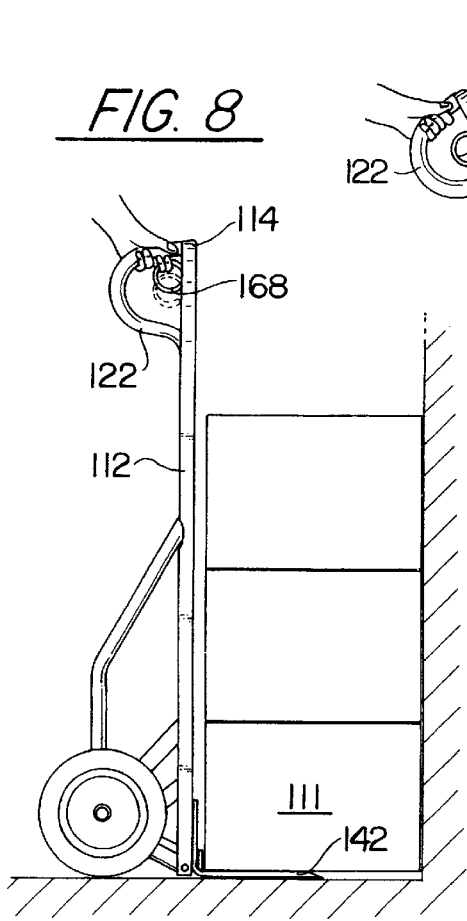
FIG. 8 is a side view of the hand truck of FIG. 7 which is about to unload a load.

With initial reference to FIGS. 1, 2 and 6, a hand truck 10 for transporting a load 11 comprises a frame 12 formed of tubular steel, for example. Specifically, the frame 12 includes an inverted U-shaped member 14 formed with two spaced apart elongated legs 16 and 18 coupled by an upper curved cross member 20. A handle 22 has a bowed section 24 at one end which is welded to the center of the curved cross member 20 and bends back between the two elongated legs 16 and 18 of the inverted U-shaped frame member 14. The handle 22 has a straight section 26 which extends downward between those legs 16 and 18. A pair of metal cross bars 28 extend across the frame legs 16 and 18 and are welded thereto as well as to the handle 22. A third cross bar 30 extends across the two legs 16 and 18 more remote from the curved cross member 20.

A separate bracket 32 is welded to and extends from approximately the midpoint of each leg 16 and 18, and bends downward to a plate 34 which is coupled to the remote end of the associated leg. Each combination of a bracket 32 and a plate 34 form a support for an axle 36 which extends between those combinations, and a separate wheel 38 is rotatably attached to the each end of the axle. Commonly each wheel 38 comprises a metal wheel on which a rubber tire is mounted.

A cargo support 40 having a load platform 42 and backrest 44 is pivotally mounted to the frame lower end, and supports the load 11 when in transit. The backrest 44 is configured to form an angle of substantially 90 degrees with the load platform 42, and is substantially coplanar with the frame 12 when the cargo support is in a latched position, shown in FIG. 1. A pair of ribs 46 formed on the rear of the backrest 44 on opposing sides of a slot 48 extend from the backrest top 50 to the backrest bottom 52. The ribs 46 strengthen the backrest 44, and provide support for a pusher plate 54 and a pusher linkage mechanism 56. Retaining plates 58 extend outward from sides 60 of the backrest 44 to prevent the cargo support 40 from rotating through the frame 12 between the frame legs 16,18. A latch plate 62 extending rearward from the backrest top 50 catches a latching mechanism 64 to hold the cargo support 40 and linkage mechanism 56 in the latched position.

Figure 4:
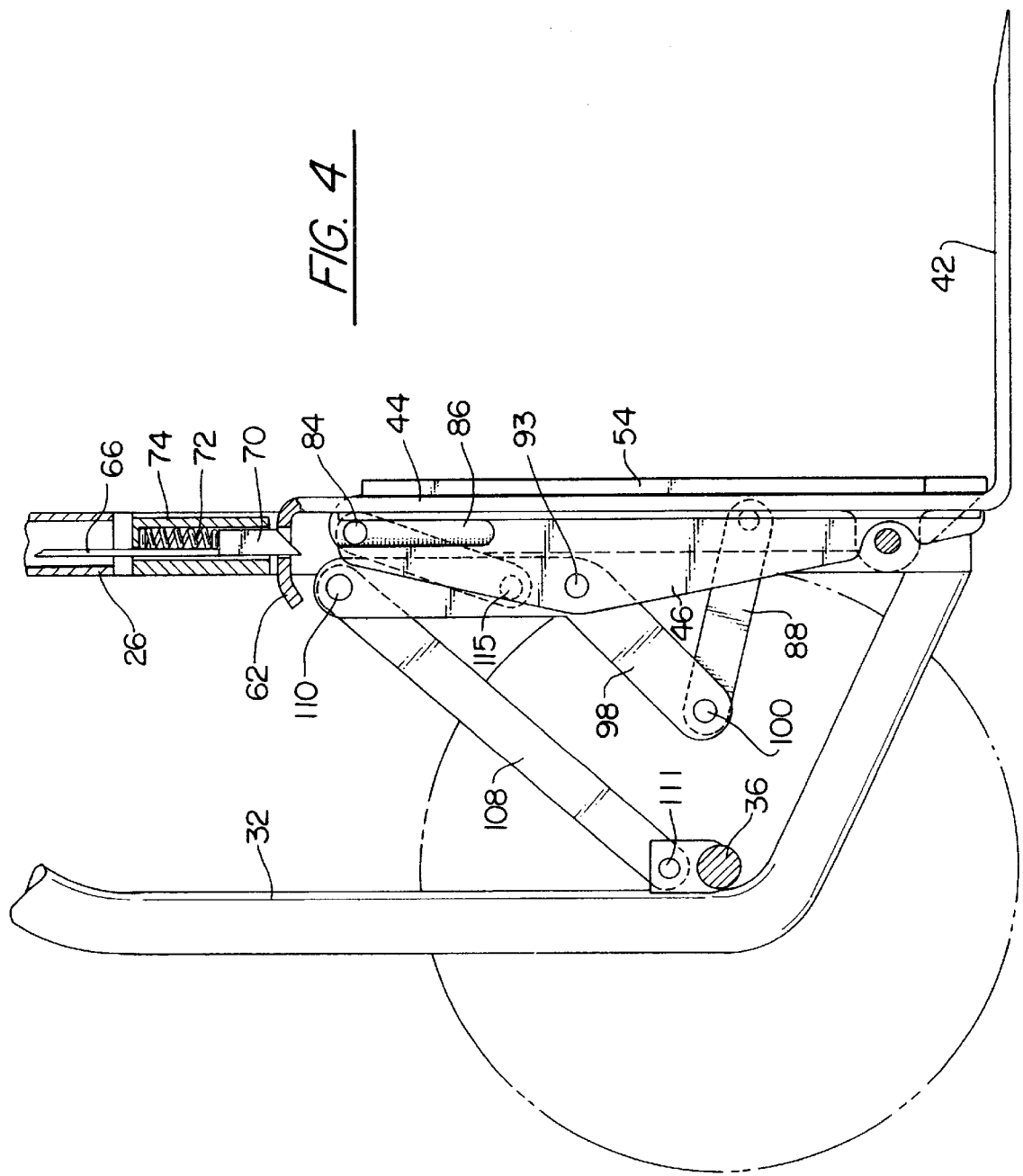
FIG. 4 is a side view of the unload mechanism of the hand truck in FIG. 1 in the latched position.

As shown in FIGS. 1, 2, and 4, the cargo support 40 and linkage mechanism 56 is maintained in the latched position by the latching mechanism 64 which engages the latch plate 62. The latching mechanism 64 includes an elongated control rod 66 extending through the handle straight section 26. The control rod 66 has a handle 68 at an upper end for grasping by a user, and is connected to a spring biased plunger 70 at an opposing end. Looking particularly at FIG. 4, the plunger 70 is biased downwardly toward the cargo support 40 by a spring 72 disposed in a housing 74 mounted to the bottom cross brace 30, and engages the latch plate 62 in the latched position. A user pulls upwardly on the control rod handle 66 to disengage the plunger 70 from the latch plate 62.

Figure 3:
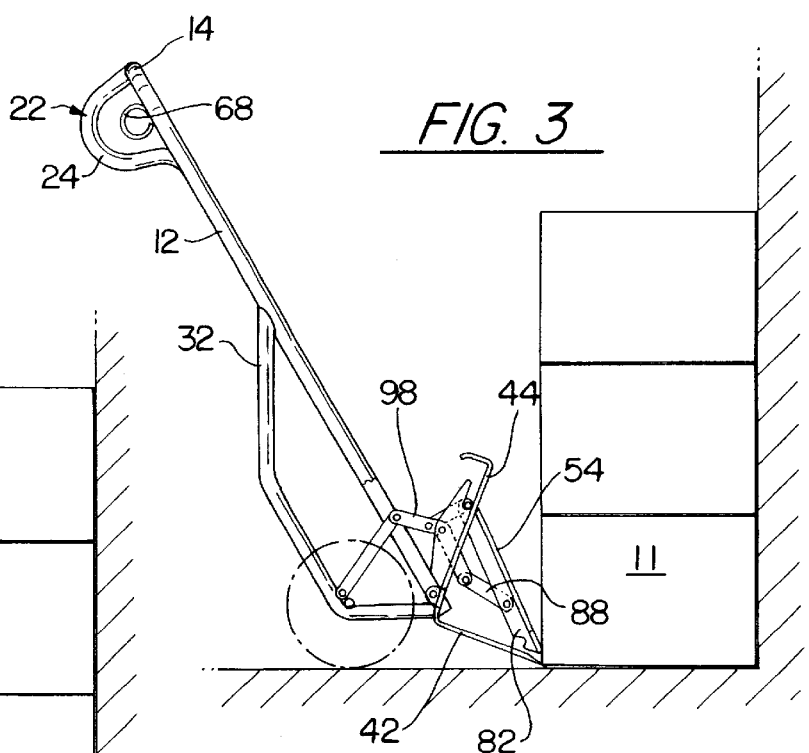
FIG. 3 is cross sectional side view of the hand truck of FIG. 1 in an unlatched position upon completion of unloading a load.
Figure 5:
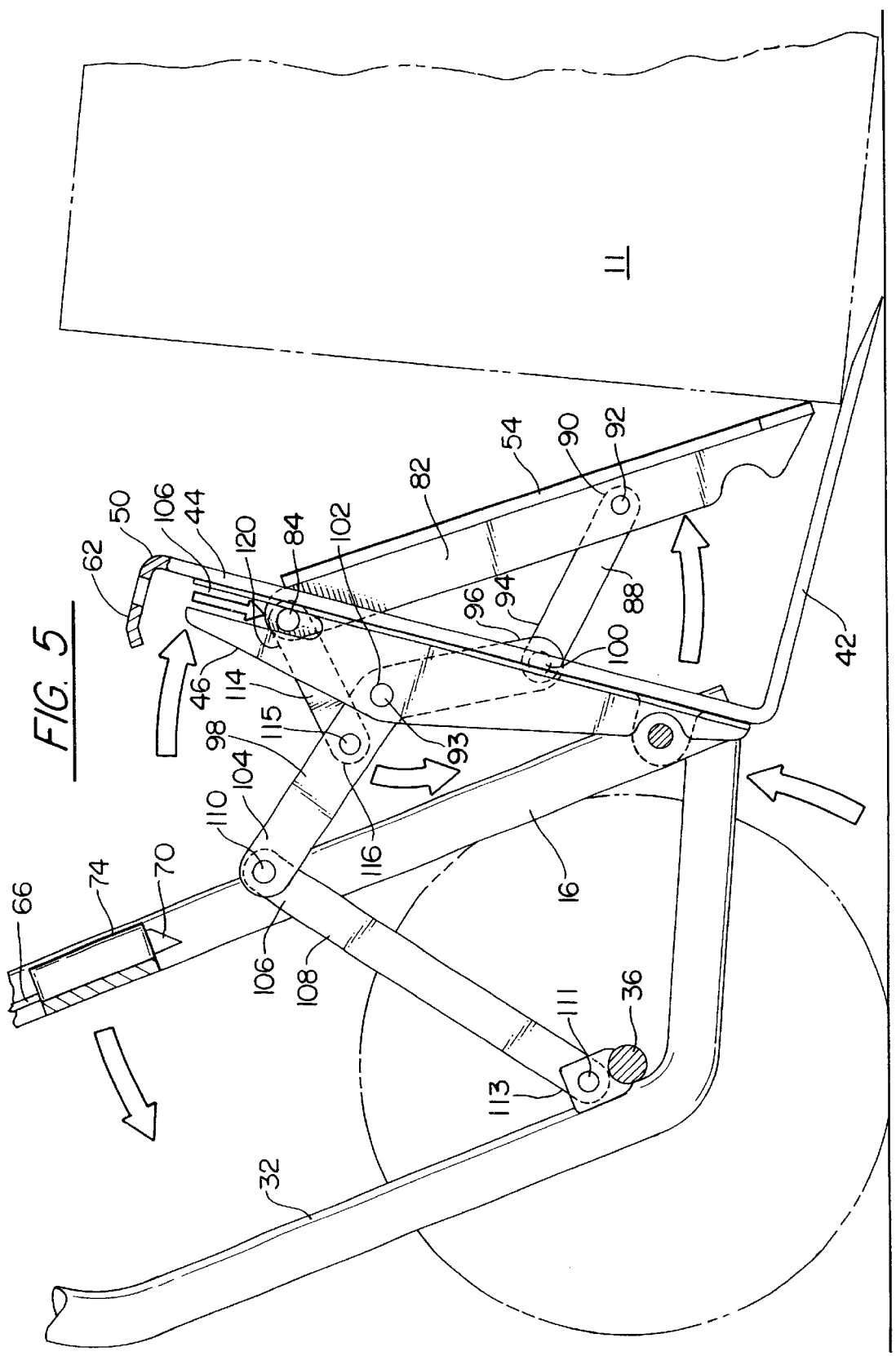
FIG. 5 is a side view of the unload mechanism of the hand truck of FIG. 1 in the unlatched position upon completion of unloading a load.

As shown in FIGS. 3 and 5, when the latch mechanism 64 is disengaged to unload a load from the cargo support 40, an unloading mechanism 76 including the pusher plate 54, slidably mounted to the cargo support backrest 44, pushes the load 11 off of the platform 42. The pusher plate 54 engages the load 11 proximal the cargo support platform 42 to minimize tipping, and is urged against the load 11 by the pusher linkage mechanism 56.

The pusher plate 54 (shown best in FIG. 6) has an inverted T-shape with a narrow top 78 and a wide bottom 80. A pin 84 mounted to the pusher plate top 78 is received in a slot 86 formed in the backrest ribs 46 to slidably mount the pusher plate 54 to the back rest 44. A pair of ribs 82 formed on the pusher plate rear extending from the pusher plate bottom 80 past the pusher plate top 78 strengthens the pusher plate 54. In the latched position, the ribs 54 extend through the cargo support backrest slot 48 rendering the pusher plate 44 substantially flush and coplanar with the backrest 44.

In an unlatched position, shown in FIG. 5, the cargo support 40 pivots forwardly, and the pusher plate bottom 80 is urged against the load 11 by the pusher linkage mechanism 56. The pusher linkage mechanism 56 has a straight push arm 88 with one end 80 extending through the backrest slot 48 and pivotally coupled to the pusher plate ribs 82 by a pin 92. The other end 94 of the push arm 88 is pivotally coupled to a pair of push ends 96 of a pair of rocker arms 98 pivotally mounted between the backrest ribs 46 by a pin 100. The push arm 88 urges the pusher plate 54 against the load 11 to urge the load 11 off of the platform 42.

Each rocker arm 98 is pivotally mounted to the ribs 82 by a pin 93 at a pivot point 102 interposed between the push end 96 and a pull end 104. Each end 96,104 of the rocker arm 98 extends away from the pivot point 102 to define an obtuse angle. Each rocker arm pull end 104 is pivotally coupled to an end 106 of a pull arm 108 by a pin 110. The rocker arms 98 transfer a force exerted on the rocker arm pull ends 104 by the pull arm 108 and transfers it to the push arm 88 to urge the pusher plate 54 against the load 11.

The straight pull arm 108 exerts a pulling force on the rocker arm pulled 104 when the hand truck frame 12 is pivoted away from the cargo support 40. An opposing end 113 of the pull arm 108 is pivotally coupled to the hand truck frame axle 36 by pin 111. When the user pulls rearward on the frame handle 22, the pull arm 108 pulls away from the cargo support 40 to pivot the rocker arm 98, and push the push arm 88.

A slip arm 114 is also pivotally coupled at one end 116 by a pin 115 to the rocker arm 98 at a point 118 interposed between the rocker arm pivot point 102 and the pull end 104. The other end 120 of the slip arm 114 is pivotally coupled to the pusher plate 54 proximal the pusher plate top 78 between the pusher plate ribs 82 by a pin 84. The slip arm 114 urges the pusher plate top 78 downwardly when the push arm 88 urges the pusher plate bottom 80 against the load 11. Urging the pusher plate top 78 downwardly while the pusher plate bottom 80 urges the load 11 off of the platform 42 minimizes slippage between the pusher plate 54 and load 11, and maintains engagement of the load 11 by the pusher plate 54 proximal the load platform 42 during the unloading process to minimize load tipping.

As shown in FIGS. 2 and 3, to unload a load 11, such as a large cardboard box containing an item of merchandise, from the cargo support platform 42, the user pulls up on the control rod handle 68 to unlatch the cargo support 40 and linkage mechanism 56 from the latched position. The user then pulls the frame handle 22 rearward to pivot the frame 12 away from the cargo support 40, and pull the linkage mechanism pull arm 108 away from the cargo support backrest 44. The pull arm 108 pulls on the rocker arm 98 which pivots at the rocker arm pivot point 102 to push the push arm 88 towards the load 11. The push arm 82 pushes the pusher plate bottom 80 toward the load 11. The pusher plate bottom 80 engages the load 11 proximal the cargo support platform 42, and urges the load 11 off of the platform 42. The slide arm 114 pivotally connected to the rocker arm 98 and pusher plate top 78 urges the pusher plate top 78 downward in the slots 86 formed in the back rest ribs 46, and prevents the pusher plate top 78 from pivoting toward the load 11, thus maintaining the pusher plate bottom 80 in contact with the load 11.

Once the load 11 is urged off of the platform 42, the user pushes on the handle 22 to pivot the hand truck frame 12 toward the cargo support 40. Pivoting the frame 12 toward the cargo support 40 retracts the pusher plate 54 by operating the linkage mechanism 56 in reverse. Once the pusher plate 54 is fully retracted, the latching mechanism 64 engages the latch plate 62 on the backrest top 50 to hold the cargo support 40 in the latched position.

In another embodiment shown in FIGS. 7–12, a hand truck 113 for transporting a load 111 includes a frame 112 such as described in the embodiment disclosed above, a cargo support 140, a pusher plate 154, and pusher plate mechanism 156.

The cargo support 140 includes a load platform 142 and backrest 144 rigidly fixed to a support structure. The load platform and backrest support the load 111 when in transit. The backrest 144 is configured to form an angle of substantially 90 degrees with the load platform 142, and is rigidly fixed to a pair of shaft support members 208 (shown in FIG. 12) fixed to a support structure 143.

Figure 12:
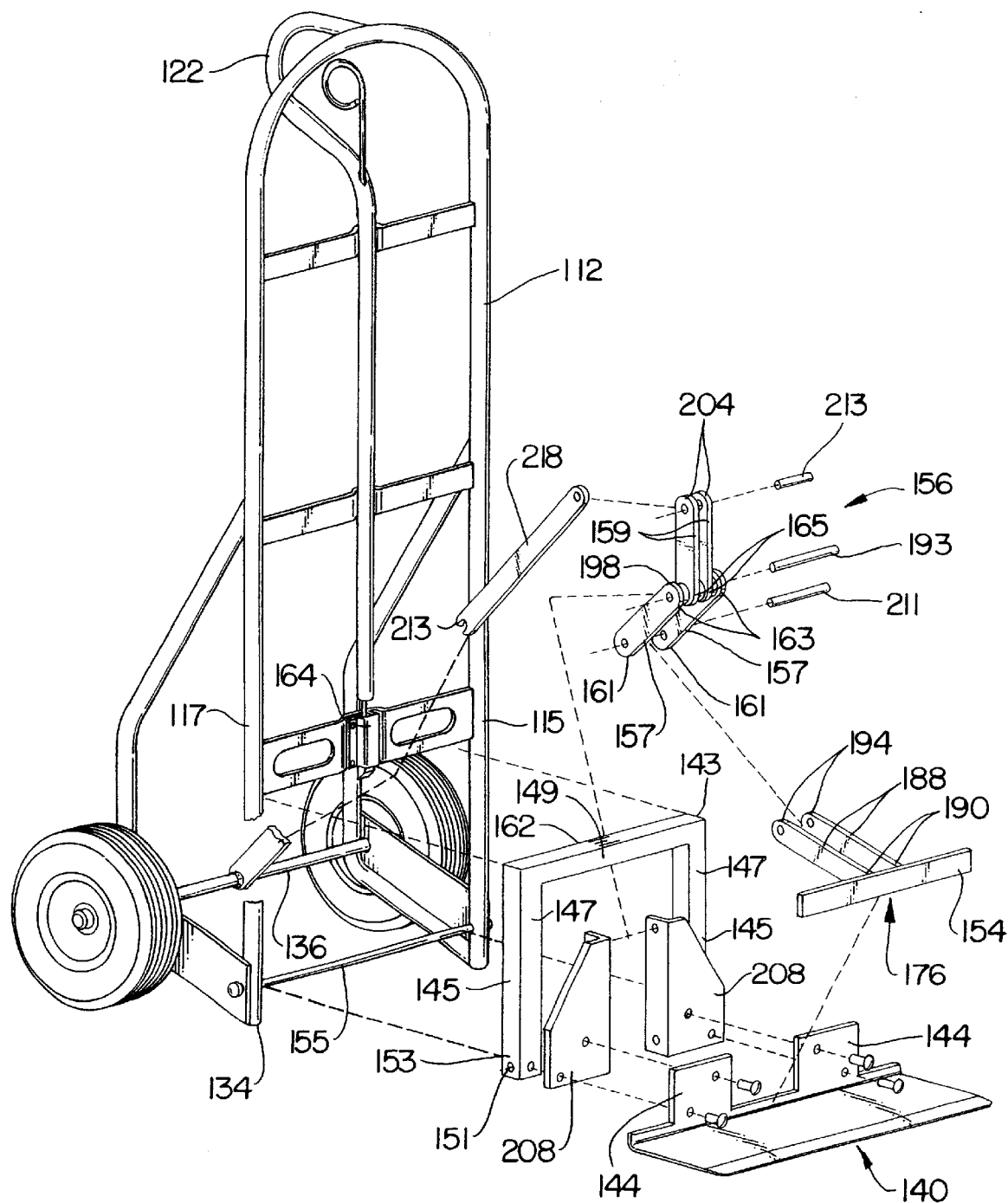
FIG. 12 is an exploded perspective view of the hand truck of FIG. 7.

Referring to FIG. 12, the support structure 143 is pivotally mounted to the frame lower end 134, and supports the pusher linkage mechanism 156. The support structure 143 includes two parallel, vertical side members 145 joined at side member top end 147 by a horizontal top member 149, and the shaft support members 208. Apertures 151 are formed in each side member lower end 153 for receiving a shaft 155. The shaft 155 is mounted to the frame lower end 134, and extends through the apertures 151 to pivotally mount the support structure 143 to the frame lower end 134. A bell crank shaft 193 is pivotally mounted to the shaft support members 208 which are fixed to the opposing side members 145 between the side member ends 147, 153.

The top member 149 is joined to the side members 145 using methods known in the art, such as by welding, and includes a catch 162 for catching a latching mechanism 164 such as described in the above embodiment. The latching mechanism 164 engages the catch 162 to secure the support structure 143 between the frame legs 115, 117, in the latched position.

Figure 9:
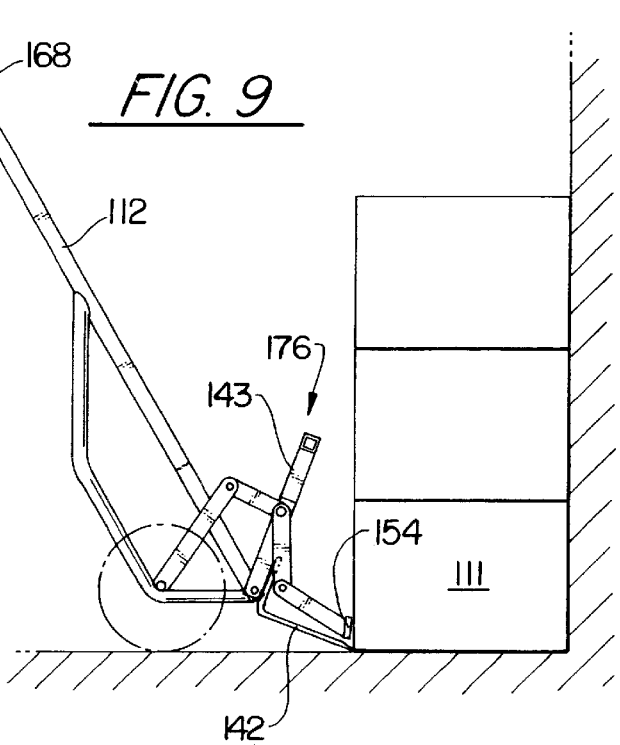
FIG. 9 is a cross sectional side view of the hand truck of FIG. 7 in an unlatched position upon completion of unloading a load.
Figure 10:
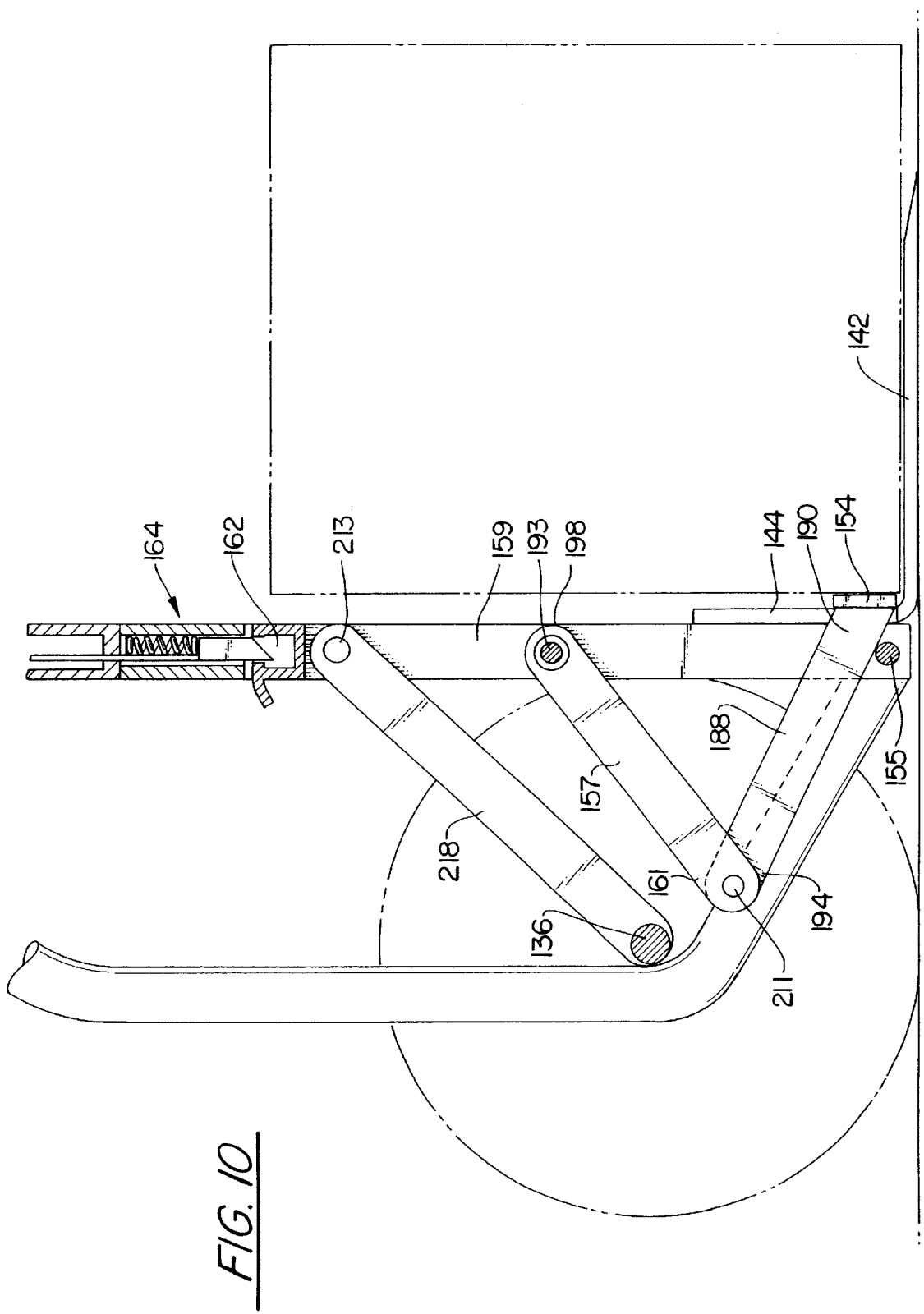
FIG. 10 is a side view of the unload mechanism of the hand truck in FIG. 7 in the latched position.
Figure 11:
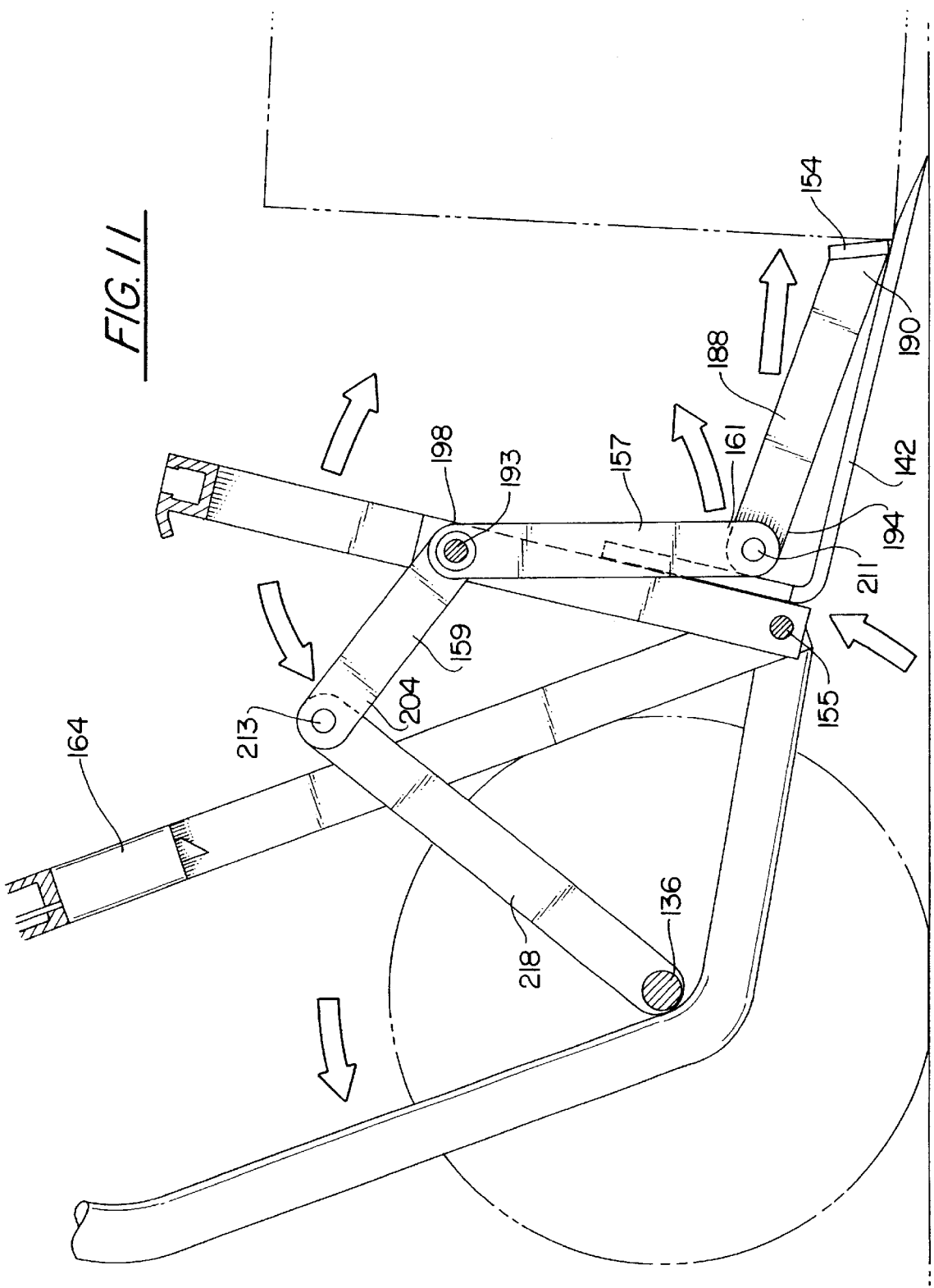
FIG. 11 is a side view of the unload mechanism of the hand truck of FIG. 7 in the unlatched position upon completion of unloading a load.

As shown in FIGS. 9 and 11, when the latch mechanism 164 is disengaged to unload a load from the cargo support 140, the unloading mechanism 176 including the pusher plate 154 pushes the load 111 off of the platform 142. The pusher plate 154 engages the load 111 proximal the cargo support platform 142 to minimize tipping, and is urged against the load 11 by the pusher linkage mechanism 156.

In an unlatched position, shown in FIG. 11, the cargo support 40 pivots forwardly, and the pusher plate 154 is urged against the load 111 by the pusher linkage mechanism 156. The pusher linkage mechanism 156 has a straight push arm 188 with one end 190 rigidly coupled to the pusher plate 154, such as by welding. The other end 194 of the push arm 188 is pivotally coupled to a bell crank 198 which transmits a force exerted by a pull arm 218 to the push arm 188. The push arm 188 urges the pusher plate 154 against the load 111 to urge the load 111 off of the platform 142.

Referring to FIGS. 11 and 12, the bell crank 198 includes the bell crank shaft 193, a pair of parallel outboard link arms 157, and a pair of central link arms 159. The link arms 157, 159 extend radially from the shaft 193. Each outboard link arm 157 has one end 163 fixed to the shaft 193, and an opposing end 161 pivotally coupled to one of the push arms 188 by pin 211. The central link arm 159 have one end 165 linked to the shaft 193 between the outboard link arm attachment points, and an opposing end 204 pivotally connected to the pull arm 218 by pin 213. The outboard link arms 157 are fixed to the shaft 193 relative to the central link arm 159 to define an obtuse angle between the outboard link arms 157 and the central link arm 159.

The straight pull arm 218 exerts a pulling force on the central link arm ends 204 when the hand truck frame 112 is pivoted away from the cargo support 140. An opposing end 213 of the pull arm 218 is pivotally coupled to the hand truck frame axle 136. When the user pulls rearward on the frame handle 122, the pull arm 218 pulls away from the cargo support 140 to pivot the bell crank 198, and push the push arm 188.

While there has been shown and described what are at present considered the preferred embodiments of the invention, it will be obvious to those skilled in the art that various changes and modifications can be made therein without departing from the scope of the invention defined by the appended claims.

I claim:

1. A hand truck for transporting a load, said hand truck comprising:

a frame having an upper portion and a lower portion;

a support structure pivotally coupled to a distal end of said lower portion of the frame and extending upwardly therefrom;

a cargo support for supporting the load during transport, said cargo support having a platform, and said cargo support being fixed to a lower portion of the support structure;

a pair of wheels rotatably mounted to the frame at said lower portion; and an unload mechanism comprising a pusher plate, said unload mechanism being operable between a latched position and an unlatched position, and said pusher plate being pivotally coupled to said support structure and said frame, such that in said unlatched position, pulling said upper portion of said frame rearward causes said pusher plate to urge said load off of said cargo support.

2. The hand truck as recited in claim 1 wherein an upper portion of said support structure defines a pivot point and said unload mechanism includes a linkage mechanism having a bell crank pivotally coupled to the support structure at said pivot point, and said linkage mechanism urges said pusher plate against the load to urge the load off of the platform.

3. The hand truck as recited in claim 1 in which the unload mechanism includes a linkage mechanism having a push arm including one end rigidly fixed to said pusher plate and an opposing end pivotally coupled to an end of a link arm of a bell crank, said bell crank being pivotally mounted to said support structure at a pivot provided on an upper portion of said support structure and having a second link arm having one end pivotally coupled to one end of a pull arm, and said opposing end of said pull arm being pivotally coupled to said hand truck frame, wherein pulling on said hand truck frame pulls on said pull arm which pivots said bell crank to push said push arm to urge said pusher plate against said load.

4. The hand truck as recited in claim 1 in which said support structure includes a latch which engages a latch mechanism to releasably retain said support structure in said latched position.

* * * * *